United States Patent [19]

Pemsler et al.

[11] 4,197,117
[45] Apr. 8, 1980

[54] RECOVERY OF COPPER BY FERROUS ION PRECIPITATION

[75] Inventors: J. Paul Pemsler, Lexington; John K. Litchfield, Bedford, both of Mass.

[73] Assignee: Kennecott Copper Corporation, New York, N.Y.

[21] Appl. No.: 962,159

[22] Filed: Nov. 20, 1978

[51] Int. Cl.² .................. C22B 15/10; C22B 15/12
[52] U.S. Cl. .................................. 75/108; 75/117; 75/121; 423/34
[58] Field of Search ................... 75/108, 117, 121; 423/34

[56] References Cited

U.S. PATENT DOCUMENTS

| | | | |
|---|---|---|---|
| 3,492,115 | 1/1970 | Mahalla | 75/108 X |
| 3,586,498 | 6/1971 | Kasey | 75/108 X |
| 3,758,665 | 9/1973 | Vojkovic | 75/108 X |
| 3,923,675 | 12/1975 | Kane et al. | 75/117 X |
| 3,931,007 | 1/1976 | Sugano et al. | 75/108 X |
| 3,951,649 | 4/1976 | Kieswetter et al. | 75/117 |
| 3,983,017 | 9/1976 | Szabo | 204/106 |
| 3,983,210 | 9/1976 | Steintveit | 423/106 |
| 4,116,488 | 9/1978 | Hsueh et al. | 299/4 |
| 4,149,880 | 4/1979 | Prater et al. | 75/121 X |
| 4,149,945 | 4/1979 | Kust | 204/119 |

Primary Examiner—G. Ozaki
Attorney, Agent, or Firm—John L. Sniado; Anthony M. Lorusso

[57] ABSTRACT

Copper is recovered from dilute, ammoniacal, copper containing solutions by adding ferrous ions to the solution to precipitate metallic copper and iron oxides. The mixed precipitate is separated from the aqueous raffinate. The precipitated copper and iron oxides are separated from each other to enable the copper to be recovered.

6 Claims, 5 Drawing Figures

RECOVERY OF COPPER BY FERROUS ION PRECIPITATION

BACKGROUND OF THE INVENTION

The present invention relates to a process for recovering copper values from ammoniacal leach liquors. There are many hydrometallurgical processes in which low levels of copper value are leached by ammoniacal leach liquors. One example of such a leaching process is the "cuprion" process disclosed in U.S. Pat. No. 3,983,017 to Lester Szabo entitled "Recovery of Metal Values from Manganese Deep Sea Nodules Using Ammoniacal Cuprous Leach Solutions," the teachings of which are incorporated herein by reference.

Another source of copper containing ammoniacal leach liquors is the pregnant liquor from certain in situ systems. An example of such an in situ system is disclosed in U.S. Pat. application Ser. No. 724,548, now U.S. Pat. No. 4,116,488, entitled "In Situ Mining Method and Apparatus," the teachings of which are incorporated herein by reference.

The recent discovery of a novel method of extracting molybdenum from dilute ammoniacal solutions is aided by the prior extraction of copper from such solutions. Thus, the present invention, in addition to extracting metallic copper from ammoniacal leach liquors as an end in itself, is useful in preparing ammoniacal leach liquors bearing both copper and molybdenum values for molybdenum extraction. For a more detailed discussion of molybdenum extraction from ammoniacal leach liquors see U.S. Pat. application Ser. No. 962,158, entitled "Recovery of Molybdenum From Dilute Solutions," filed on even date herewith, the teachings of which are incorporated herein by reference.

SUMMARY OF THE INVENTION

The instant invention provides a method of recovering highly pure copper typically present in relatively small concentrations in many ammoniacal leach liquors.

In practicing the invention, ferrous ions are added to the leach liquor in sufficient quantities to precipitate copper and iron oxides. The mixed precipitate is separated from the raffinate. The iron oxides may then be removed magnetically from the remaining copper or the copper can be selectively leached or extracted from the iron oxides.

The process of the present invention has an additional advantage when the pregnant leach liquor also contains molybdenum. In such situations, the instant process while recovering the copper values, augments later ferrous complexing of molybdenum values. This occurs both through removal of competing copper ions and through increasing the ferrous ion concentration in the solution.

Accordingly, it is an object of the invention to render hydrometallurgical mining techniques more economically feasible.

Another object of the invention is to provide a rapid and inexpensive method of concentrating and recovering the copper values in ammoniacal leach liquors.

Another object of the invention is to provide an overall copper recovery process well suited for use upstream of a system for recovering molybdenum and other metals from ammoniacal leach liquors.

DESCRIPTION OF THE PREFERRED EMBODIMENT

At the outset the invention is described in its broadest overall aspects with a more detailed description following. In its broadest overall aspects, the invention comprises a rapid and inexpensive method of concentrating the copper values present in ammoniacal leach liquors. In the concentration process, ferrous ions, preferably but not necessarily as ferrous sulfate, are added to the copper containing leach liquor to precipitate the copper values therein as copper metal. Sufficient $Fe++$ ion is added to saturate the solution, and then excess $Fe++$ is added to precipitate a solid whose approximate Fe/Cu ratio is 2.6 by weight. The precipitate produced is largely iron oxides and copper. The iron oxide in the mixed precipitate is separated from the copper in the mixed precipitate.

There are three preferred methods of separating the copper from the iron in the mixed precipitate.

Figure 1:
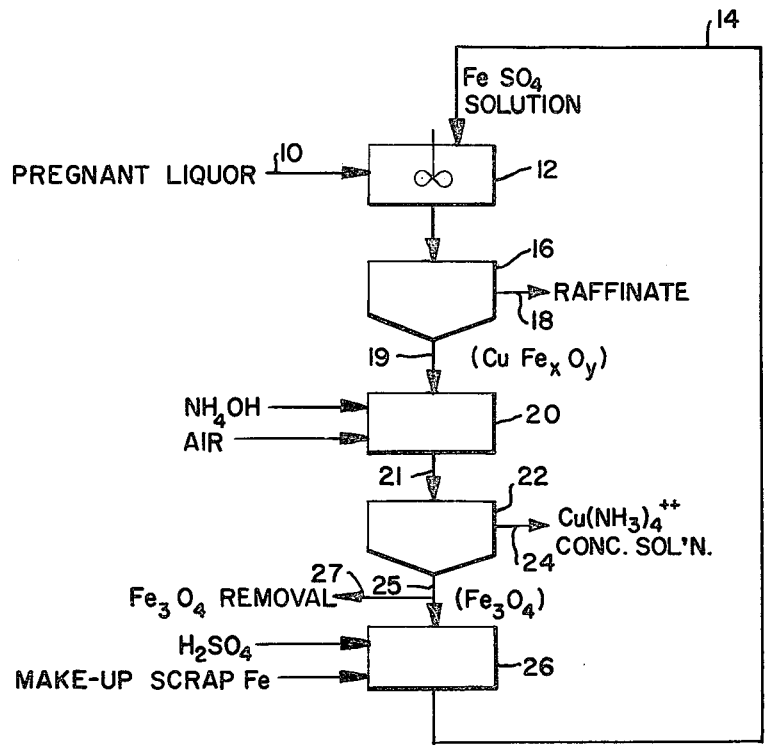
FIG. 1 is a schematic diagram illustrating one important embodiment of the invention which includes precipitating copper and iron oxides and later separating copper values from the mixed precipitate by a procedure which includes selectively dissolving copper by aeration of the slurry containing the mixed precipitate.

One method, which is shown in FIG. 1, involves aerating the mixed precipitate while suspended in an ammoniacal liquor. Such aeration causes the copper to go into solution leaving the iron in the solid state. After a solid-liquid separation, the copper can be recovered from the aqueous phase. The iron in the solid phase can be dissolved in an acid, i.e., sulfuric acid, for recycle. Any iron in the ferric state can be reduced to the ferrous state by conventional techniques such as adding scrap iron to the recycle liquor.

Figure 3:
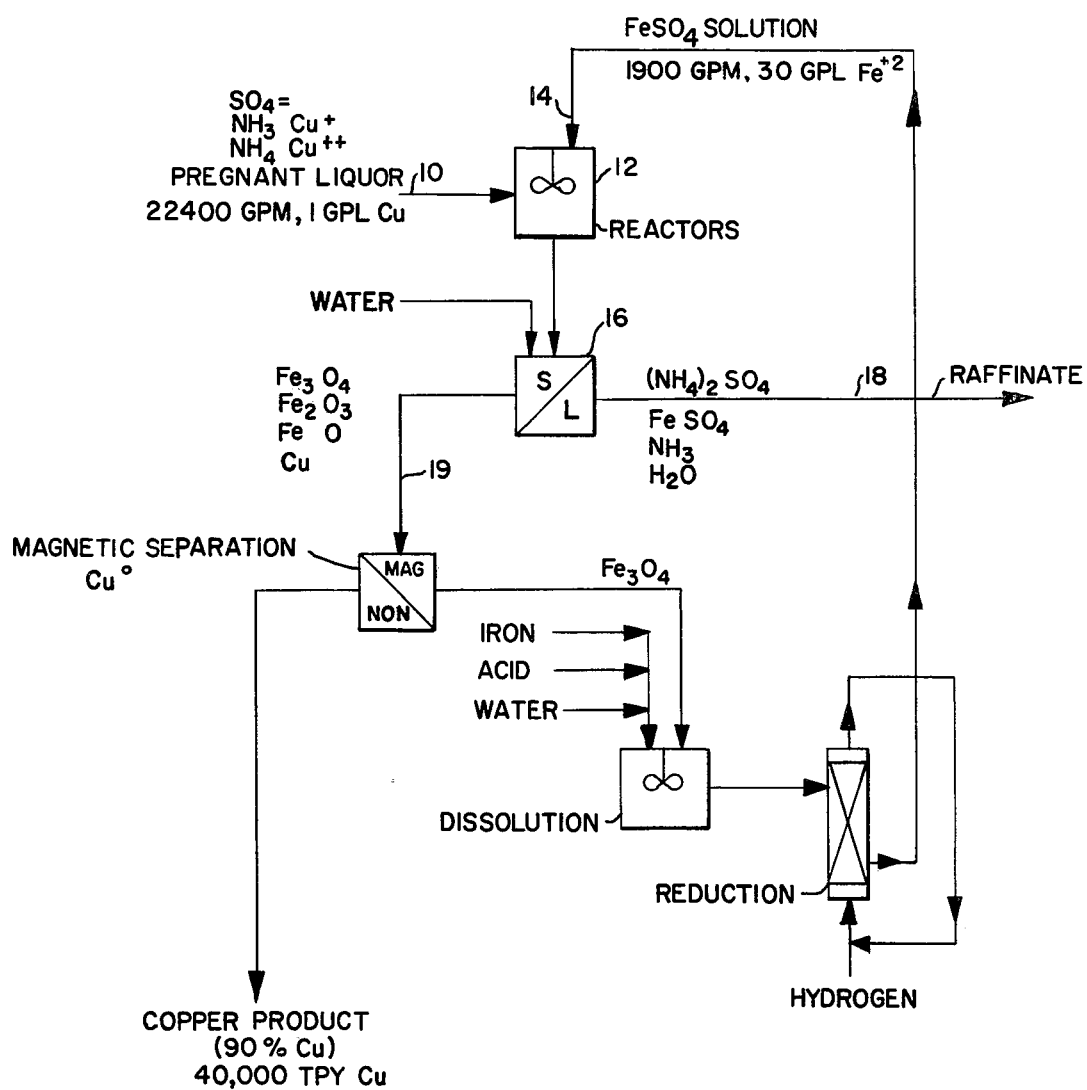
FIG. 3 is a schematic diagram illustrating another important embodiment of the invention which includes precipitation of copper and iron oxides and later separating iron oxides from the copper magnetically.

Another method of separating the iron in the mixed precipitate from the copper involves magnetic removal of the iron. This embodiment of the invention is shown in FIG. 3.

Figure 2:
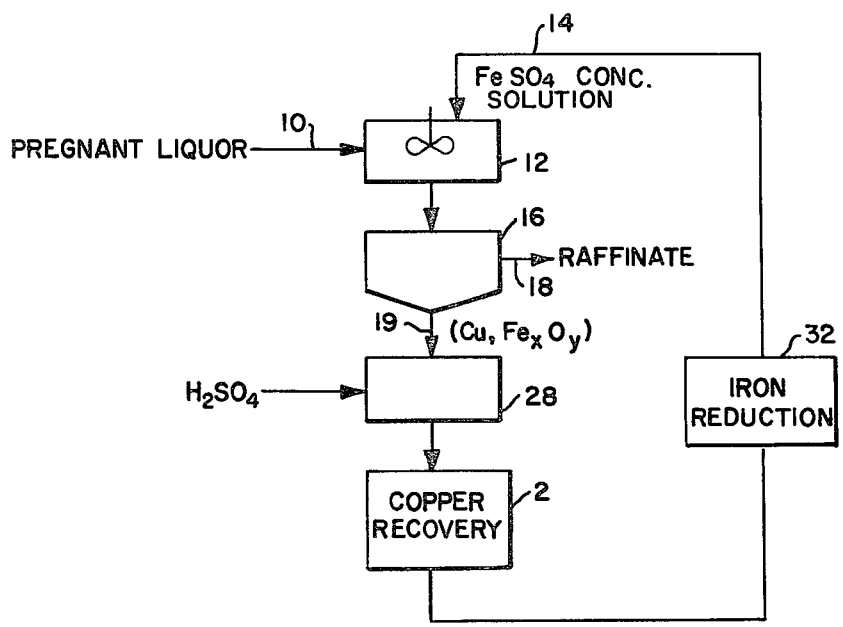
FIG. 2 is a schematic diagram illustrating another important embodiment of the invention which includes precipitating copper and iron oxides and later separating copper values from the mixed precipitate by a procedure which includes dissolving both the copper and iron in an acid and later selectively extracting the copper from the iron.

A third method for recovering the copper from the mixed precipitate involves redissolving both the copper and the iron in an acid. The acidic leach liquor containing both the copper and iron values is treated to selectively recover the copper values. This embodiment of the invention is shown in FIG. 2.

The raffinate of the process of the present invention is depleted of copper and iron values, but may still contain molybdenum values. The copper-and iron-free molybdenum-bearing raffinate may be treated by precipitating the molybdenum values with ferrous ion. For a more detailed discussion of using ferrous ions to precipitate molybdenum values see U.S. patent application Ser. No. 962,158, entitled "Recovery of Molybdenum from Dilute Solutions," filed on even date herewith, the teachings of which are incorporated herein by reference.

With regard to the presence of other ions in the leach liquor, there is no interference by alkali metals (Na, K, etc.) alkaline earth metals (Ca, Mg, etc.) or Al. Nickel goes through the process unaffected. Cobalt behavior is complex and some cobalt can be removed if the cobalt concentration is high. In the dilute solution of the type produced in in situ mining, cobalt precipitation is not a problem.

In the process of the present invention, ferrous ions are added to the leach liquor in sufficient quantities to first saturate the solution and then in excess to set the Fe/Cu weight ratio above 2, preferably about 2.6, so that substantially all of the values are precipitated. To increase the rate of the precipitation reaction, the leach liquor may be heated to 30° C. or more; although, the reaction will proceed at lower temperatures, i.e., 20° C.

It is preferred to add the ferrous ion as ferrous sulfate; however, other ferrous reagents such as ferrous chloride, ferrous carbonate, or ferrous nitrate could be used. Ferrous hydroxide will remove small amounts of copper from solution. It is necessary that the ferrous ions be added in solution or as a soluble compound or salt.

The ferrous requirement is made up of two parts. First, ferrous ions will go into solution until the solubility limit is reached. The solubility of ferrous ions in ammonia/ammonium solutions is a complex function of both the ammonia concentration and the ammonium ion concentration. (Reference: D.J. Klocke and A.N. Hixson, Ind. Eng. Chem. Process Des. Develop., Vol. 11, No. 1, 1972, pp. 141-6) Typically with in situ leach liquors, the ferrous ion solubility is of the order of 0.2–2.0 g/l. After saturating the solution, it is necessary to add enough ferrous ion to achieve about 3 moles of ferrous for each mole of copper in solution. This is equivalent to a weight ratio of iron to copper of about 2.6:1. Thus, the amount of ferrous ion to be added will depend both on the copper content of the solution and the ammonia and ammonium contents. Therefore, different amounts of ferrous ion may be required for solutions with identical copper concentrations.

Lime may be added to the leach liquor to precipitate excess sulfate as gypsum. The copper containing precipitate as well as the precipitated iron oxides and any gypsum can be separated from the leach liquor as a mixed solid. The solid phase may then be contacted with acid, e.g., sulfuric acid, to selectively resolubilize the iron and copper values. Thereafter, the gypsum is separated from the concentrated copper containing solution and the copper is recovered by conventional techniques such as ion exchange. Note that prior to sulfuric acid solubilization of copper values, iron oxides may be magnetically separated from the precipitate. The substantially copper-free raffinate which remains after separation of the mixed solids contains ferrous ions. These will be useful if molybdenum is both present and to be later removed. If the raffinate is to be reused as a leach liquor after the instant extraction process, the ferrous ions must be removed prior to such reuse. An example of a reuse would be reintroducing the raffinate into an in situ mine. Accordingly, the liquid phase is treated to precipitate the iron, preferably by air oxidation. To conserve ferrous sulfate, the resulting iron oxides are treated with sulfuric acid and scrap iron to regenerate $FeSO_4$.

There are many sources of copper solutions that can be treated using the process of the invention; and, it will be appreciated that the process is useful in precipitating the copper content of liquors having copper concentrations both higher and lower than approximately 1 g/l copper solution discussed herein. Typically, the aqueous lixiviants of in situ mining contain dissolved ammonia, ammonium ion, sulfate ion, and copper values present on the order of 1.0 g/l as cuprous and cupric ion. On addition of ferrous sulfate to the leach liquor, copper and iron oxides precipitate. Experiments indicate that the precipitate has an Fe/Cu weight ratio of about 2.6:1. To assure that copper precipitation is complete, an excess of ferrous sulfate is added to the leach liquor, e.g., a weight ratio of Fe/Cu greater than 3 is established after accounting for the Fe++ required to saturate the solution.

The reactions which occur during the process are set forth below.

1. Precipitation $$2 FeSO_4 + Cu(NH_3)_4SO_4 + 2NH_3 + 3H_2O \rightarrow Cu^\circ + 3(NH_4)_2SO_4 + Fe_2O_3$$

$$FeSO_4 + 2NH_3 + H_2O \rightarrow (NH_4)_2SO_4 + FeO$$

$$FeO + Fe_2O_3 \rightarrow Fe_3O_4$$

2. Dissolution
$$Fe_2O_3 + 3H_2SO_4 \rightarrow Fe_2(SO_4)_3 + 3H_2O$$

$$FeO + H_2SO_4 \rightarrow FeSO_4 + H_2O$$

$$Fe_3O_4 + 4H_2SO_4 \rightarrow Fe_2(SO_4)_3 + FeSO_4 + 4H_2O$$

3. Hydrogen Reduction
$$Fe_2(SO_4)_3 + H_2 \rightarrow 2FeSO_4 + H_2SO_4$$

4. Liming
$$CaO + (NH_4)_2SO_4 + H_2O \rightarrow 2NH_3 + CaSO_4 \cdot 2H_2O$$

The present invention is further illustrated by the following non-limiting examples.

The embodiment of the invention involving aeration of the mixed precipitate to selectively dissolve the copper values is shown in FIG. 1. Referring to FIG. 1 in more detail, ammoniacal liquor 10 containing copper values is introduced into a mixing tank 12. A source of ferrous ion such as ferrous sulfate 14 is also introduced into reactor 12 in amounts sufficient to precipitate copper and leave molybdenum in the raffinate. This is achieved adding the stoichiometric amount of Fe++ needed to precipitate copper and iron. The reactants are allowed to contact each other while in mixing vessel 12 to produce a slurry containing a precipitate of copper and iron oxide which is delivered to a clarifier 16.

The raffinate 18 from clarifier 16 is substantially copper and iron free. This raffinate may be treated to recover other ions of interest such as molybdenum.

The solid from the clarifier 18, is typically $Fe_3O_4$ plus some additional $Fe_2O_3$ and $FeO$, the total being designated as $Fe_xO_y$. Such solids are delivered to a mixing vessel 20 as is shown by arrow 19. In mixing vessel 20, an amount of an aqueous ammonium hydroxide solution is added and air is bubbled through the slurry. The amount of ammonium hydroxide utilized is sufficient to dissolve the copper values as cupric ions and air is bubbled through the slurry until all the copper is dissolved. During this oxidation all of the iron values are converted to $Fe_3O_4$.

The slurry from reactor 20 is delivered to the clarifier 22 as is shown by arrow 21. In clarifier 22 the copper values which are in the liquid stage is separated from the iron which is in the solid phase. The copper containing liquid phase 24 may be treated in any conventional manner to recover the copper. A typical scheme is to extract the copper values onto an oxime such as LIX 64N sold by General Mills Corporation; strip the extracted copper values with an acid; and, recover the stripped copper values in the acid solution by electrowinning.

The iron in the solid phase, $Fe_3O_4$, is delivered to a reaction vessel 26 as is shown by arrow 25. In vessel 26 sufficient sulfuric acid is added to solubilize the iron. Since a portion of the iron in tank 26 is in the ferric state, reduction will be necessary if the liquor in vessel 26 is to be used as a recycle stream 14. Accordingly, scrap iron or another inexpensive reductant may be introduced into vessel 26 to regenerate the ferrous ion for such recycle. If scrap iron is the preferred reductant, then iron balance will be maintained by diverting a portion of the iron oxide to waste as shown by arrow 27.

FIG. 2 illustrates the embodiments of the invention wherein both the copper and the iron which precipitate are dissolved in an acid. In this embodiment of the invention, the solids from clarifier 16 are delivered to a reactor 28 as is shown by arrow 19. The solids in reactor 28 are contacted with a mineral acid to dissolve the iron and copper values. Sulfuric acid is preferred, of course, however, any acid that would dissolve iron and copper values could be utilized.

With the iron and copper in solution and highly concentrated, it is economically feasible to recover the copper values from the now acidic leach liquor by a number of known procedures at 2. For example, oximes can be utilized to extract copper from acidic leach liquors. Once the copper is loaded onto an oxime, it can be stripped from the oxime with acid. Such copper recovery from acidic solutions is, of course, well known.

Typical extractants for extracting copper from acidic solutions include LIX 64N sold by General Mills. This reagent contains the active extractant 2-hydroxy-4-nonyl-benzophenoxime.

That portion of iron in the ferric state is reduced with a suitable reductant, such as scrap iron, in reactor 32 prior to recycle.

The embodiment of the invention involving magnetic separation of the iron from copper is shown in FIG. 3.

In accordance with this embodiment of the invention, the solids 19 from clarifier 16 are delivered to a magnetic separation circuit. In this circuit, the iron is removed from the copper magnetically.

Figure 4:
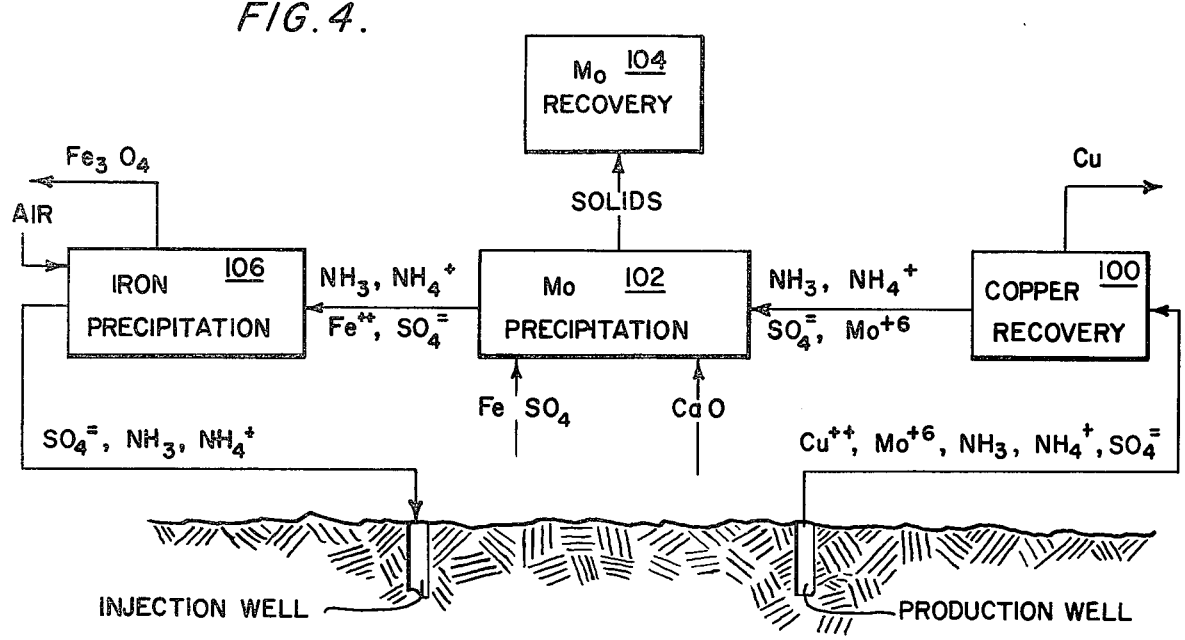
FIG. 4 is a schematic diagram illustrating the copper recovery process of the present invention in relationship to an in situ mine.

FIG. 4 illustrates the sequence of operations for treating in situ leach liquors to recover copper and molybdenum using the concentration technique of the invention. A leach liquor or lixiviant containing ammonia, copper, molybdenum, ammonium, and sulfate ions is extracted from a production well and fed to a copper recovery system 100. The leach liquor is first decopperized by ferrous ion using any of the foregoing schemes and then fed to a precipitator 102 wherein the molybdenum values are precipitated by the addition of ferrous sulfate, and excess sulfate is converted to gypsum by the addition of lime. The phases are then separated and the molybdenum containing solids delivered as a slurry to a molybdenum recovery system 104. The substantially copper-and molybdenum-free aqueous leach liquor, now containing substantial quantities of ferrous ion is delivered to reactor 106 where the ferrous values are removed prior to reintroducing the leach liquor into an injection well of an in situ mine for additional copper and molybdenum recovery.

In the embodiment shown in FIG. 4, the iron is removed by sparging air through the leach liquor, resulting in the production of iron oxide which may be separated by filtration or the like. Those skilled in the art will readily appreciate that there are various other suitable methods for reducing the iron concentration to a few parts per million to render the leach solution suitable for reintroduction into the in situ well. However, air oxidation is preferred because of its low cost.

The invention is further illustrated by the following nonlimiting examples.

A simulated solution of an ammonia leach liquor containing copper values was treated with various amounts of ferrous ions. The result of these tests are set forth in Table I below. In addition to the simulated solution, actual production liquor from Kennecott Copper Corporation's in situ mine in Safford, Ariz. was treated in accordance with this invention. The results of this test also appear in the table below.

TABLE I

| Copper Removal from In-Situ Pregnant Liquor | | |
|---|---|---|
| Simulated Solution: 23 g/l $NH_3$, $Cu^{++}$ = 0.91 g/l | | |
| $Fe^{++}$ added, g/l | % Cu Removed | Fe in raffinate, ppm |
| 1.50 | 21 | 16 |
| 1.67 | 26 | 7 |
| 2.00 | 80 | 20 |
| 2.10 | 75 | 7 |
| 2.50 | 99 | 7 |
| 2.70 | 99 | 62 |
| 3.75 | 99 | 520 |
| In-Situ Production Liquor RT-2: 12 g/l $NH_3$, $Cu^{++}$ = 0.51 g/l | | |
| $Fe^{++}$ added, g/l | % Cu Removed | Fe in raffinate, ppm |
| 2.7 | 99 | 62 |

Figure 5:
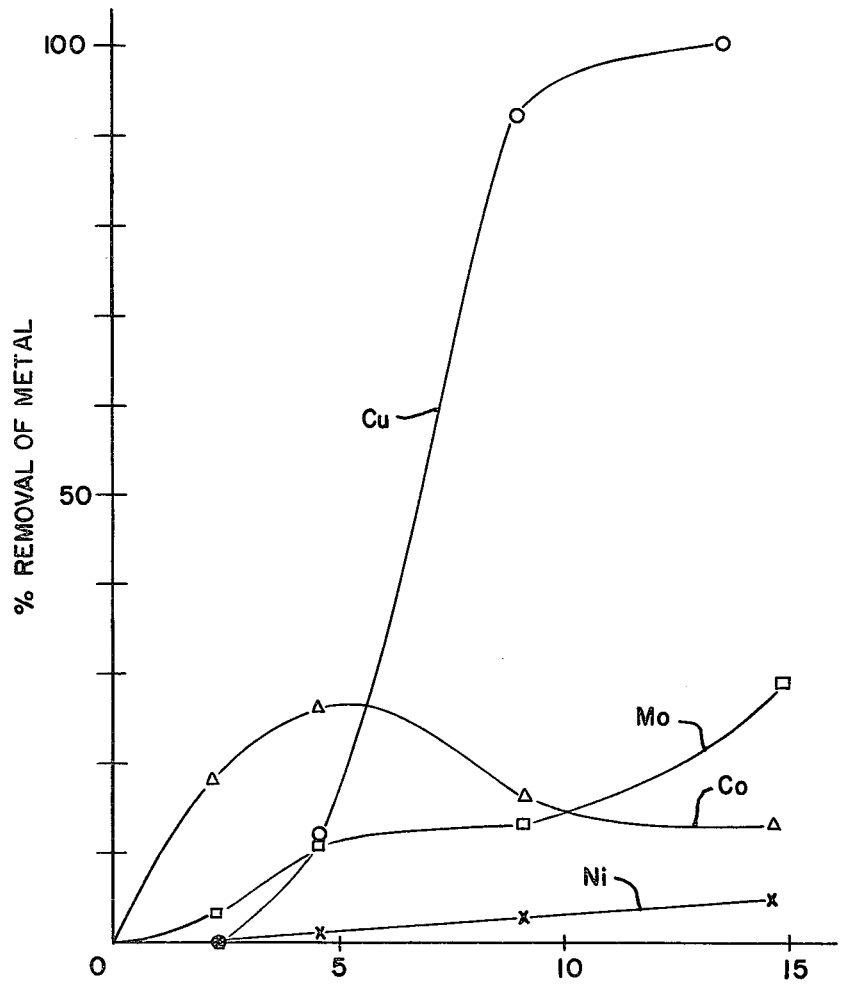
FIG. 5 is a graph showing the effect of ferrous ion on metal removal from pregnant liquor from the "cuprion" process.

Ferrous ion in the form of sulfate was also added to pregnant liquor from deep sea nodules. The process utilized to produce the pregnant liquor containing copper, nickel, cobalt, and molybdenum values was the cuprion process which is set forth in U.S. Pat. No. 3,983,017. FIG. 5 shows the percent of removal of copper, nickel, cobalt, and molybdenum from pregnant nodule liquor as a function of the amount of ferrous ion added. Copper removal from nodule leach liquor is similar to copper removal from in situ liquors where the iron:copper ratio necessary for complete precipitation is about 2.6:1. It is interesting to note that cobalt removal occurs in preference to copper at low ferrous ions addition and decreases as the copper is precipitated. Molybdenum rises gradually, requiring relatively large amounts of iron, and nickel is only slightly affected. Of course, once copper removal is complete, further addition of ferrous ion would result in large percentages of molybdenum being precipitated.

Numerous tests have indicated that with any ammoniacal leach liquor containing copper values, copper removal increases linearly with ferrous ion addition. 99% removal of copper from a 0.91 gram per liter copper ammoniacal solution occurs when about 2.6 grams per liter of iron are added. Thus, the iron:copper ratio in the precipitate will be about 2.6:1. The $Fe^{++}$ content of the raffinate is low (7ppm) until a quantity of iron necessary for precipitation of all the copper is exceeded by an appreciable amount.

In one preferred embodiment for practicing the invention, in situ pregnant liquor at 22,400 gpm and 1 g/l copper is contacted in a series of reactors with a solution containing ferrous sulfate at 30 g/l and sulfuric acid at 10 g/l. Under these conditions copper precipitates as metal, iron precipitates as an oxide (predominantly $Fe_3O_4$). The slurry discharges from the reactors into a clarifier. The clarifier overflow liquor is copper free. The clarifier underflow containing the precipitate is filtered, washed, and repulped for magnetic separation of the copper and iron oxides. Washing is necessary to recover residual ammonia values.

The recovered solids including some solid recycle, go to wet magnetic separation. The non-magnetic fraction containing the copper is thickened and filtered. This is the product. The magnetic fraction containing the bulk of the iron oxides and some copper is ground in a ball mill to liberate residual copper. The ball mill product is magnetically separated. The non-magnetic fraction containing the liberated copper is recycled. The magnetic fraction goes to iron dissolution.

The iron oxides from magnetic separation and make up scrap iron are dissolved in sulfuric acid for recycle to the copper precipitation reactors. This solution produces the ferric/ferrous mixture which is hydrogen reduced to all ferrous. A palladium catalyst is used to enhance reduction rates. Preferred design parameters for the foregoing process are set forth below.

MAJOR DESIGN BASES AND ASSUMPTIONS

Pregnant Liquor 1 g/l copper.
40,000 TPY copper at 90% recovery.
(330 days/year).

Precipitation Reactors

90+% copper removal from raffinate, 10 ppm residual iron.
3 stages, 5 minutes/stage, 1 HP/1000 gal.
Two trains.

Raffinate Clarifier/Filter 1 gpm/ft$^2$ for clarifier area (liquid controlled).
50 lb./hr./ft$^2$ filtration rate (solids limited);
2:1 wash ratio.
80% solids product.

Recycle FeSO$_4$ Solution 30 g/l $Fe^{+2}$, 10 g/l $H_2SO_4$.

Magnetic Separation

Magnetic separation all at 25% solids.
Two wet magnetic separators in closed circuit with a ball mill.
10 TPH/ft., both separation steps.

Copper Product Thickener/Filter 10 ft.$^2$/TPD for thickener area (solids controlled).
50 lb./hr./ft.$^2$ filtration rate (solids limited).
80% solids final product.

Dissolution 2 stages, 15 minutes/stage, 1.5 HP/1000 gal.

Hydrogen Reduction

Internal hydrogen recycle 900% of stoichiometric with recompression.
Packed tower with Pd catalyst impregnated on packing.

Product Specifications

90% copper, 10% $Fe_3O_4$ (dry basis).

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A process for recovering copper values in an aqueous ammoniacal leach liquor, said process comprising the steps of:
   A. adding ferrous ions to the liquor in sufficient quantities to form a mixed precipitate containing copper metal and iron oxides;
   B. separating the copper-containing mixed precipitate from the aqueous liquor; and,
   C. recovering the metallic copper from the mixed precipitate.

2. The process as set forth in claim 1 wherein the copper-containing mixed precipitate is contacted with an acid to dissolve both the copper and the iron and the copper is selectively extracted from the iron.

3. The process as set forth in claim 2 wherein the copper-containing mixed precipitate is contacted with sulfuric acid.

4. The process as set forth in claim 1 wherein the copper in the mixed precipitate is separated from the iron by being dissolved in an ammonia leach liquor by aeration of the mixed precipitate in contact with an ammoniacal liquor.

5. The process as set forth in claim 1 wherein the ferromagnetic components of the mixed precipitate are separated from the non-magnetic components by magnetic separation.

6. The process as set forth in claim 1 wherein the ferrous ions are added as FeSO$_4$.

* * * * *